US004001748B2

United States Statutory Invention Registration [19]

[11] Reg. Number: H1748

[45] Published: Sep. 1, 1998

Marinelli et al.

[54] PACKAGE FOR PACKS, FOR EXAMPLE, PACKS OF SANITARY PRODUCTS

[76] Inventors: Luigi Marinelli, Via Ravenna, 36-65122 Pescara, Italy; Gianfranco Palumbo, Procter & Gamble GmbH, Sulzbacher Strasse 40-50, Schwalbach am Taunus, Germany

[21] Appl. No.: 356,191

[22] PCT Filed: Jun. 16, 1993

[86] PCT No.: PCT/US93/05897

§ 371 Date: Feb. 17, 1995

§ 102(e) Date: Feb. 17, 1995

[87] PCT Pub. No.: WO94/00362

PCT Pub. Date: Jan. 6, 1994

[30] Foreign Application Priority Data

Jun. 19, 1992 [IT] Italy ..... TO92A0526

[51] Int. Cl.[6] ..... B65D 71/00

[52] U.S. Cl. ..... 206/83.5

[58] Field of Search ..... 206/442, 83.5, 206/477, 434, 576, 813, 494; 53/419, 443, 447; 229/87.01

[56] References Cited

U.S. PATENT DOCUMENTS

| | | | |
|---|---|---|---|
| 1,764,569 | 6/1930 | Knee . | |
| 2,062,539 | 12/1936 | Vogt . | |
| 2,666,710 | 1/1954 | Peters . | |
| 2,703,764 | 3/1955 | Vogt . | |
| 3,113,673 | 12/1963 | Stein | 206/813 X |
| 3,246,744 | 4/1966 | Marnon . | |
| 3,430,845 | 3/1969 | Susuki et al. | 229/87.01 X |
| 3,987,901 | 10/1976 | Dullinger | 206/813 X |
| 4,079,566 | 3/1978 | Stoecklin . | |
| 4,441,611 | 4/1984 | Sommariva | 206/813 X |
| 4,669,611 | 6/1987 | Flaherty . | |
| 5,036,978 | 8/1991 | Frank et al. | 206/494 |

FOREIGN PATENT DOCUMENTS

| | | |
|---|---|---|
| B 63888/80 | 5/1982 | Australia . |
| 41 20 480 | 12/1992 | Germany . |
| 42 13 463 | 10/1993 | Germany . |
| 394944 | 6/1965 | Switzerland . |

*Primary Examiner*—Michael J. Carone
*Assistant Examiner*—Theresa M. Wesson

[57] ABSTRACT

A package for packs, for example packs of absorbent articles, each pack comprising a plurality of such absorbent articles and a wrapper of flexible material with a carrying handle at the top. The package comprises a plurality of packs disposed side by side and fixed together with adhesive tape, the adhesive tape being detachable without tearing the flexible material. Each handle is capable of supporting the weight of the entire package.

1 Claim, 7 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PACKAGE FOR PACKS, FOR EXAMPLE, PACKS OF SANITARY PRODUCTS

DESCRIPTION

The present invention relates to a package, particularly but not exclusively for packs of sanitary products, for example, plastics packs for products such as babies' disposable nappies.

Plastics bags are becoming the most widespread type of pack for sanitary products such as babies' disposable nappies and are particularly suitable for compressed products, that is, products which have been subjected to a certain degree of compression before insertion in the bags in order to obtain smaller packs which occupy less space and use less raw material.

Once packed, the bags are package in corrugated cardboard boxes for despatch; the cardboard box simplifies the handling and transportation of the bags and also constitutes a sales unit for the product.

However, cardboard boxes represent a considerable quantity of material which has to be purchased and stored by the user who uses it to pack products and which, once the goods have arrived at their destination, is then generally disposed of by the purchaser.

Moreover, when bags of disposable nappies are packaged in cardboard boxes the space inside the boxes cannot be fully utilised because of the tolerances imposed by the usual automatic mechanical boxing systems generally used.

The problem of the utilization of space is made even more important by the increasingly widespread use of pallets of standard dimensions for the transportation of the boxes, in response to the requirements of large distribution and sales organisations.

The object of the present invention is to improve the characteristics of packages, for example, for plastics packs of sanitary hygiene products, such as babies' disposable nappies, by means of a package which avoids the use of corrugated cardboard boxes and which has the characteristics recited in the followwing claims.

Figure 1:
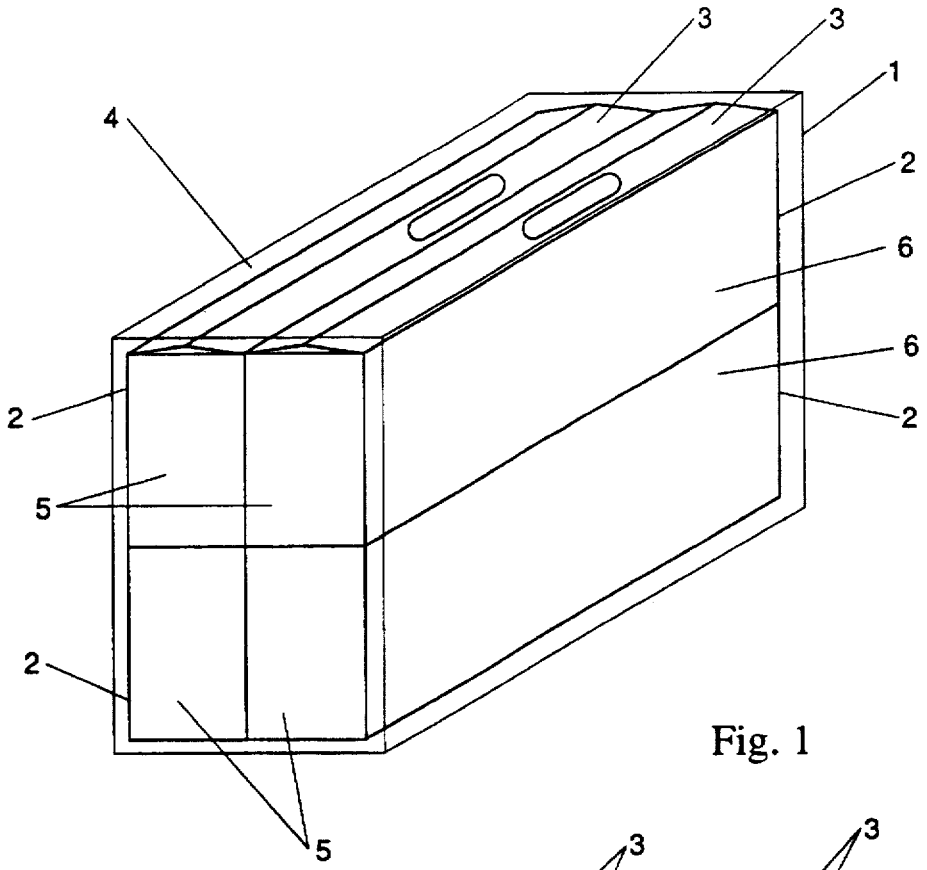
Figure 2:
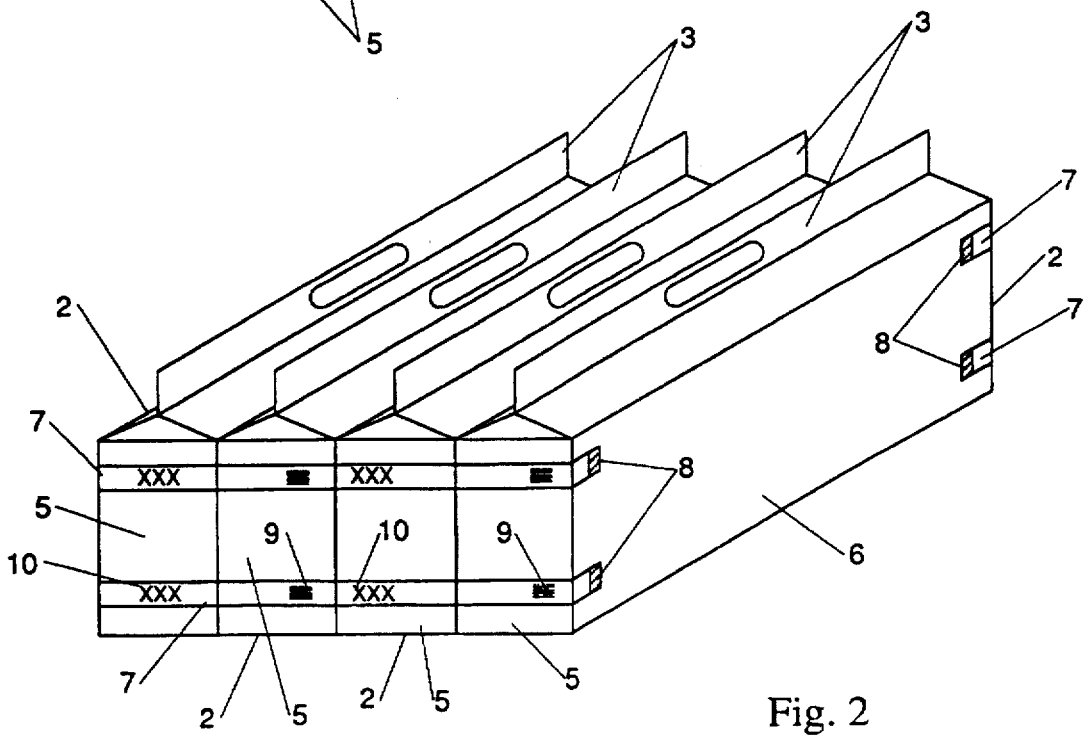
Figure 3:
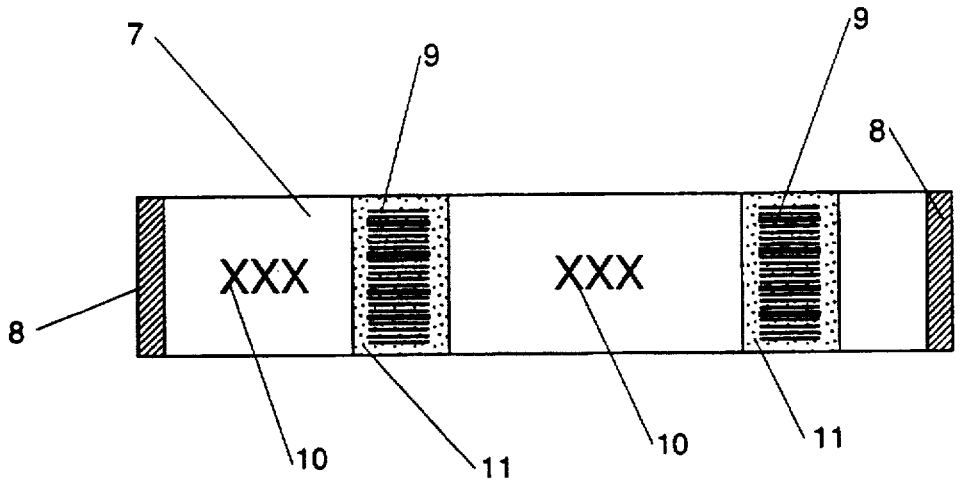
Figure 4:
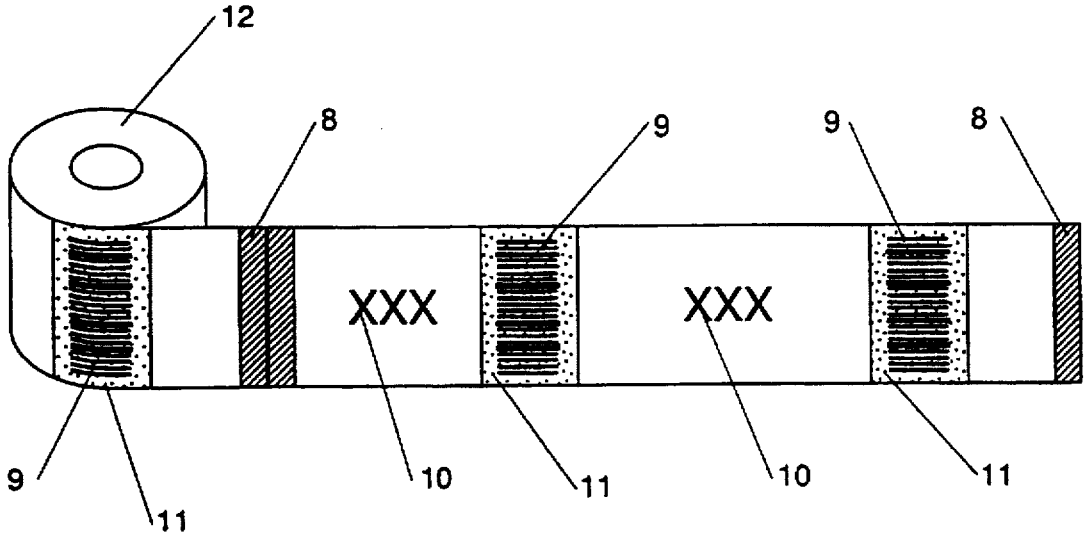
Figure 8:
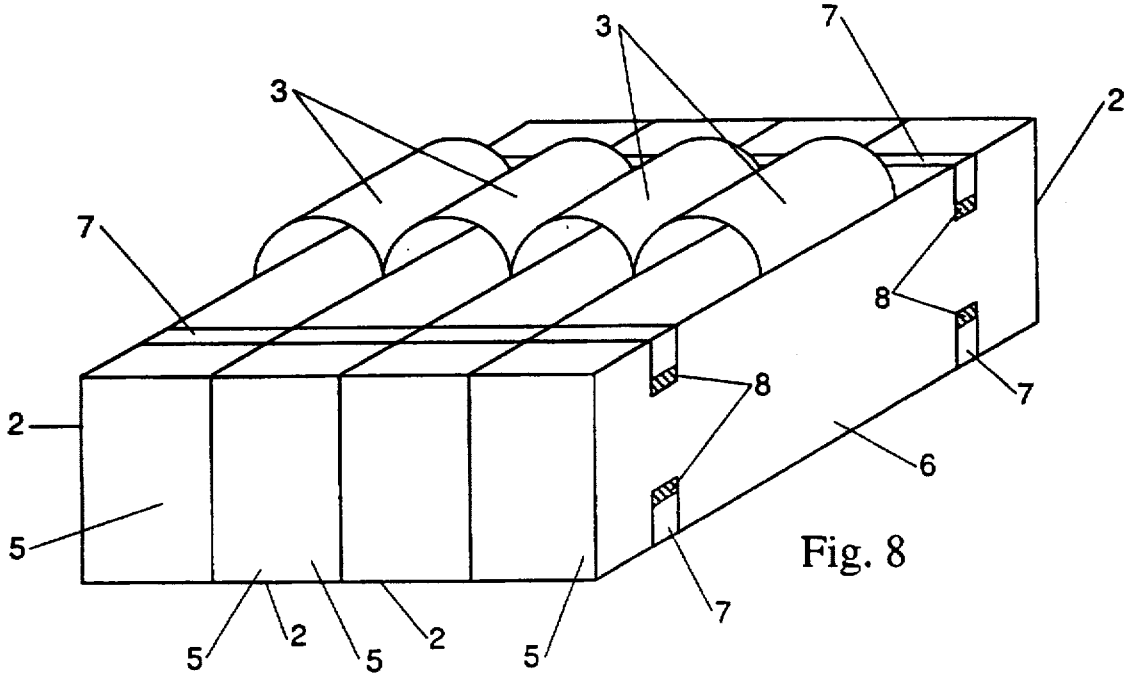
Figure 9:
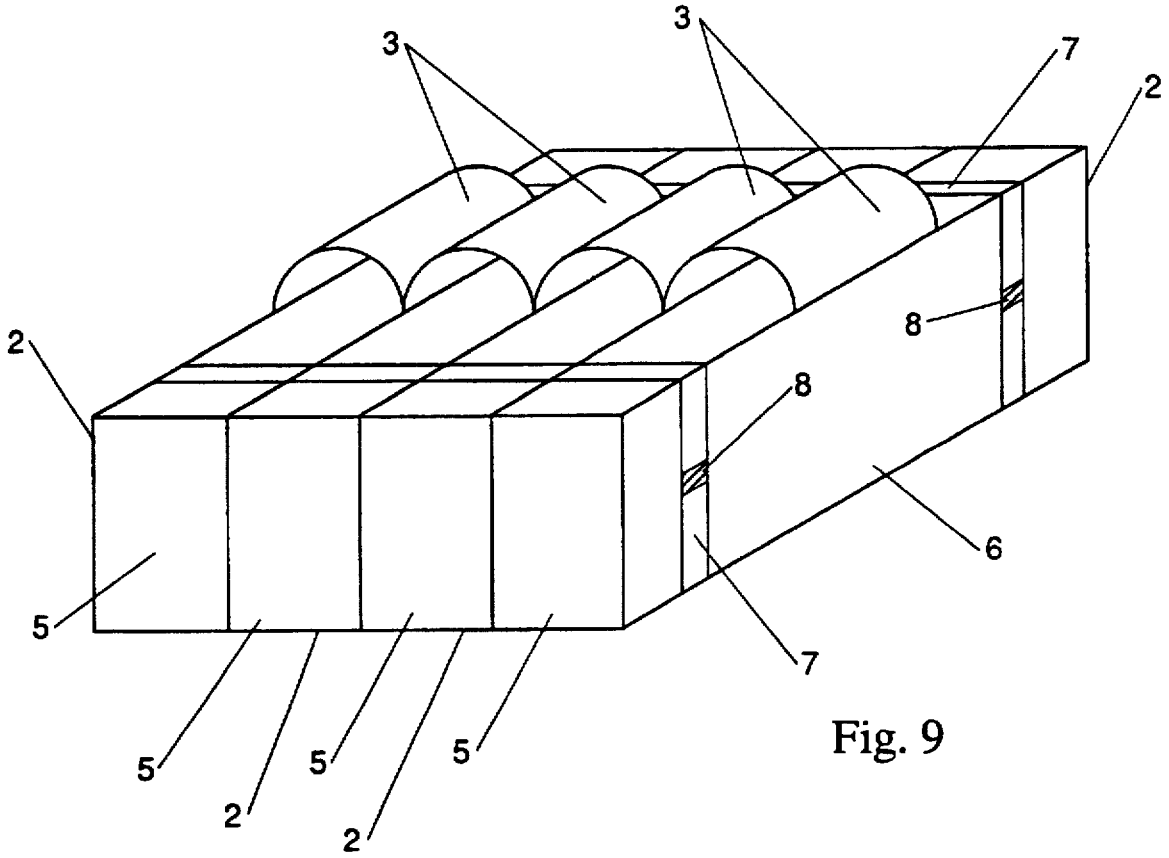
Figure 10:
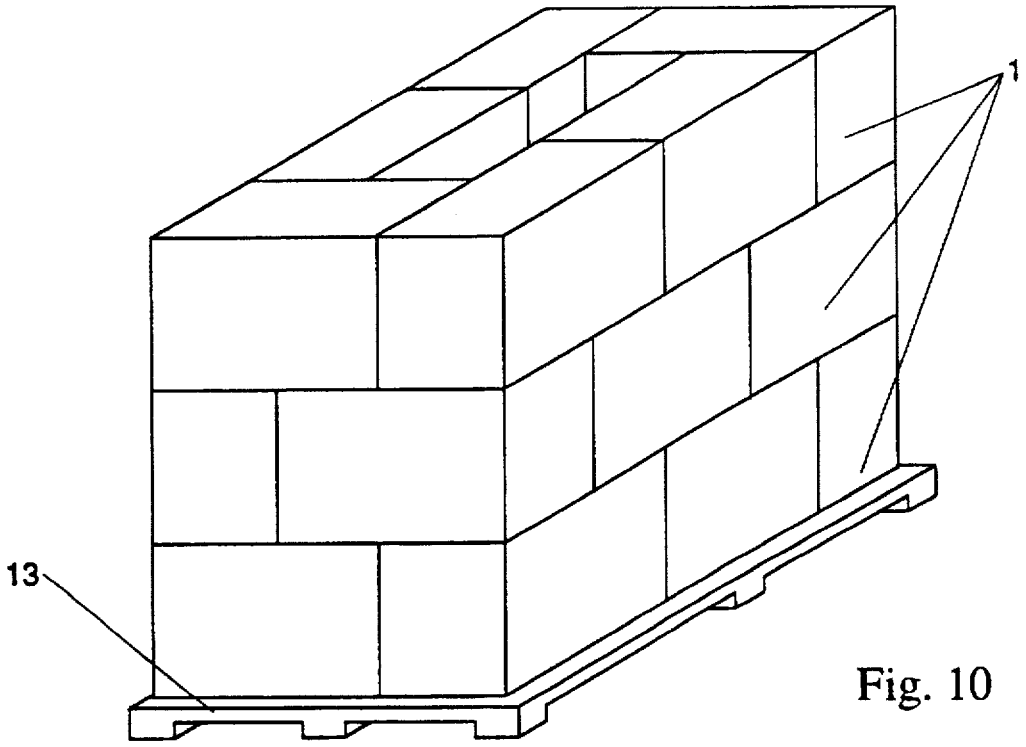
Figure 11:
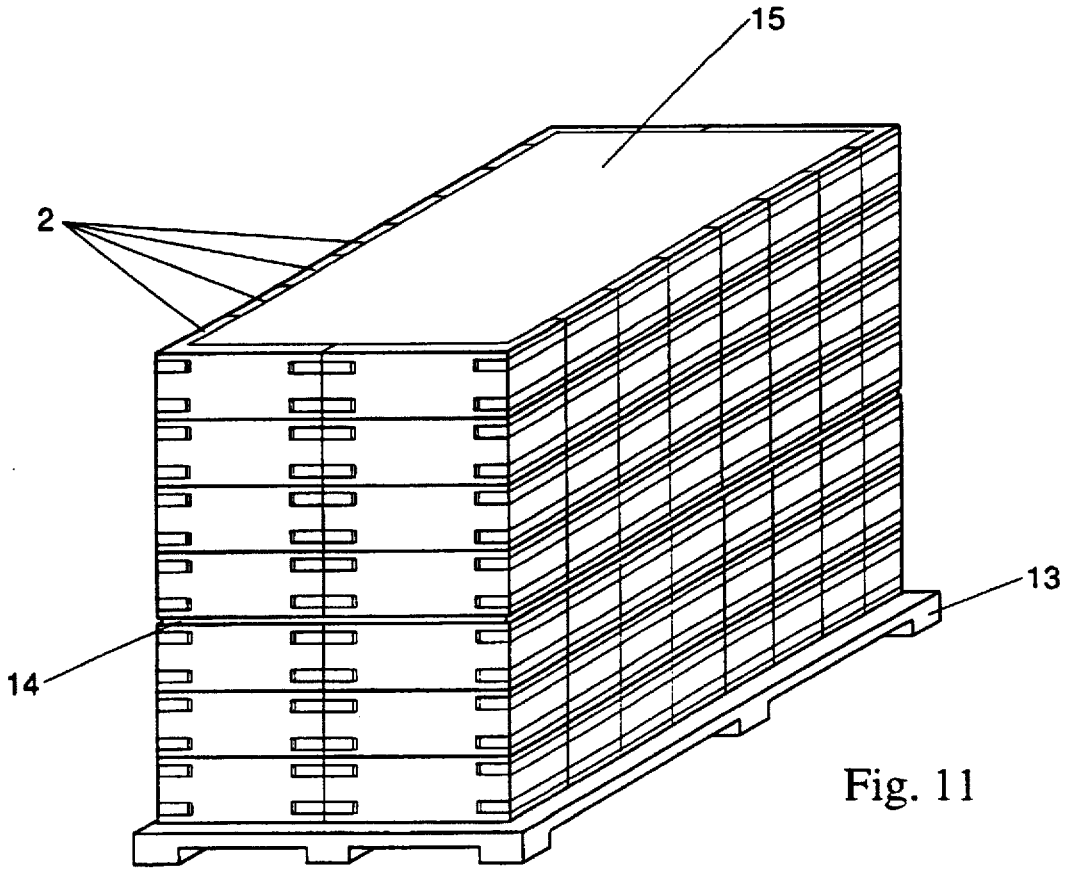

Further characteristics and advantages of the invention will become clear from the following description, given purely by way of non-limiting example with reference to the appended drawings, in which:

FIG. 1 is a perspective view of a conventional package of four plastics packs of sanitary hygiene products which are housed in a corrugated cardboard box with the box shown transparently to show its contents more clearly, FIG. 2 is a perspective view of the same four packs, packaged according to the present invention, FIG. 3 shows a portion of the adhesive tape used to form the package according to the present invention, FIG. 4 is a view of a roll of adhesive tape from which the portion shown in FIG. 3 can be formed, FIGS. 5–9 are perspective views of a corresponding number of alternative configurations of a package of four packs formed according to the present invention, FIG. 10 is a perspective view of the arrangement of corrugated boxes of the type illustrated in FIG. 1 on a pallet, FIG. 11 is a perspective view of the arrangement of packages formed according to the present invention on a pallet of the same type, and FIGS. 12–19 show a perspective schematic view of different configurations of a package according to the invention.

The package of the present invention will be described herein, by way of example, in relation to its use for plastics packs of sanitary products such as babies' disposable nappies; in this connection, it should be pointed out that the following description relates to a preferred embodiment of the present invention; it should be understood, however, that the present invention is also applicable to packs of other types, such as containers made of semi-rigid material, for example light card, or of different shapes.

By way of reference, FIG. 1 shows a conventional package constituted by a corrugated cardboard box 1 containing four plastic packs 2 of disposable nappies.

The packs 2 are of the type commonly available commercially and generally comprise a handle 3 at the top to enable the user to carry them.

FIG. 1 shows one of the possible configurations with the four packs 2 disposed in the two superposed layers within the box 1.

To enable the packs 2 to be inserted by packaging machines, however, some of the space in the box is not filled; Fig. 1 shows the spaces 4 left between the packs 2 and the walls of the box 1 along its longer sides.

FIG. 2 shows the same packs 2 packaged according to the present invention; the packs are placed one beside the other in a single row with their longer sides next to each other in a manner such that their eight shorter sides 5, four adjacent sides at each end, the two outer longer sides 6 of the two end packs and, finally, the upper and lower faces of the packs face outwardly.

In the configuration shown, the packs are bound together by means of at least four pieces of adhesive tape 7 applied, two on each side and parallel to each other, to the two shorter sides 5 of each pack, forming a package which takes up less space than the cardboard box 1 although it contains the same number of packs 2.

The package can easily be picked up and carried by hand by being gripped, for example, by the handles 3 of the two end packs; the handle 3 of each individual pack 2 can preferably support the weight of the entire package.

On each of the two ends of the package formed by the four adjacent shorter sides 5 of the packs 2, one of the two pieces of adhesive tape 7 is positioned high up, a short distance from the upper edges of the shorter sides 5 and parallel thereto, and the other piece is positioned low down, a short distance from the lower edges of the sides 5.

In general, at least one piece of adhesive tape 7 is positioned within the upper halves of the adjacent shorter sides 5 on each side of the package and at least one further piece is positioned within their lower halves; the portion of each shorter side 5 which is between the upper tape and the lower tape is preferably tall enough to include an opening system for the pack of nappies such as, for example, that described in patent application IT 67217 A/90.

In any case the widths of the pieces of adhesive tape 7 should be such that the tapes cover in total at least 20% of the surfaces of the shorter sides 5 of the packs 2.

The two ends of each piece of adhesive tape 7 also extend partially along two outer longer sides 6 in order to improve the grip of the tape and hence the stability of the group of packs.

Each end of each piece 7 has an adhesive-free region 8 which can easily be gripped in order to start the removal of the tape and thus separate one or more packs 2 from the group.

The adhesive tape of which the pieces 7 are formed must have certain characteristics in relation to thr substrate constituting the wrappers of the packs of nappies to which it is to be applied, which is typically of printed plastics, for example, polyethylene film.

In particular, the tape should not have a tendency to leave some of the adhesive on the substrate to which it is applied during the removal of the tape form the wrapper of the pack and should not give rise to relative slippage between the tape and the substrate during thre life of the package; these characteristics may be expressed in terms of the creep strength of the adhesive tape in relation the substrate.

The degree of tackiness of the adhesive tape, which can be measured as the peel strength of the adhesive tape in relation to the substrate, should be such as to confer good stability to the group of packs under normal handling and transportation stresses but, at the same time, must enable the tapes to be removed easily when the individual packs are separated from the package; in any case, the peel strength of the adhesive tape should be less than the strength of the substrate to which it is applied so that, when the adhesive tape is removed, the substrate which is made, for example, of the polyethylene film typical of nappy packs, is not torn.

Moreover, the tape must have good long-term stability to ensure constant peel strength and shear strength throughout the life of the package, which includes the periods of time during which it is transported and stored both by the producer and by the customer.

Finally, the tape should have a tensile strength such that it can withstand the stresses to which it may be subjected during the life of the package without breaking.

The shear strength was measured by the PSTC7 Test, Method A for measurement at ambient temperature and Method C for measurement at 50° C., which are described in the Ninth Edition of "Test Methods for Pressure Sensitive Tapes" published by the Pressure Sensitive Tape Council, Suite 201, 104 Wilmot Road, Deerfield, Ill., U.S.A., and modified as follows.

For both the methods a steel support plate was used, and was covered by a layer made of the same material as the packs 2, typically a polyethylene film 80 microns thick, which had the same dimensions as the plate and was fixed thereto.

The roller used to press the test sample onto the substrate weighed 2 kg and the weight used for the test also weighed 2 kg.

The sample of adhesive tape used for the test was 25.4 mm (1 inch) wide and was stuck to the substrate so as to cover an area of 25.4×25.4 $mm^2$ (1 square inch).

The test evaluated the ability of an adhesive tape to remain adhering to the substrate under a load applied parallel to the surface of the tape.

One end of the adhesive tape was fixed to the test surface which was disposed vertically, and a weight was applied to the other end; the time required to remove the adhesive tape completely from the test surface under the load exerted by the weight was measured.

The peel strength was evaluated by the "FINAT Test Method No. 2" (FTM2) described in "FINAT Pressure Sensitive Laminates Suppliers and Users Technical Manual", 1985 edition, published by FINAT Pressure Sensitive Technical Committee and available from FINAT Secretariat, Laan Copes Van Cattenburch 79, 2585 EZ, The Hague, NL and modified as follows.

The glass support plate used for the test was replaced by a 50×160 mm plate 6 mm thick formed by two 3 mm wood fiber panels (faesite) covered on one side with a layer of plastics laminate with a smooth, opaque outer finish, the plate as a whole showed the laminate on both faces.

A layer, having the same dimensions as the plate and made of the material of which the packs 2 are formed, typically a polyethylene film 80 microns thick, was fixed to one face of the plate.

The peel strength of the adhesive tape was tested on the surface of the sheet material fixed to the plate.

The force required to remove and adhesive tape previously applied to a test surface was measured, with an angle of 90° between the direction of the force and the surface.

An adhesive tape from which to form the pieces 7 having the desired characteristics may be constituted by a substrate film of polypropylene 35 microns thick suitably rendered adhesive so that it has a peel strength of between 0.2 N/cm and 2.5 N/cm, preferably between 0.8 N/cm and 1.6 N/cm, and a shear strength of at least 500 min measured at ambient temperature and at least 50–60 minutes measured at 50° C., in relation to the substrate to which it is stuck.

The adhesive tape from which the pieces 7 are formed may be transparent so that, once applied to the packs 2 it does not conceal the surfaces of the packs, which are generally printed.

It can be seen from FIG. 3 that a bar code 9 for the automatic identification of the product during handling and an alphanumeric code 10 for immediate visual identification can preferably be applied to each piece of adhesive tape 7; the codes can be used advantageously both by the manufacturer and by the customer.

In order to prevent the automatic reading of the bar code from being made difficult by the underlying printing on the pack, the portion 11 of adhesive tape corresponding to the bar code may be made opaque, for example, it may have a black background.

Each piece of adhesive tape 7 having the preferred characteristics and also including the adhesive-free regions 8 and the codes 9 and 10 may be formed from a continuous tape wound in the form of a roll 12, as shown in FIG. 4.

FIGS. 5–9 show some alternative configurations of the package formed according to the present invention; the numerals used in these drawings refer to the same elements as in FIG. 2.

Figure 5:
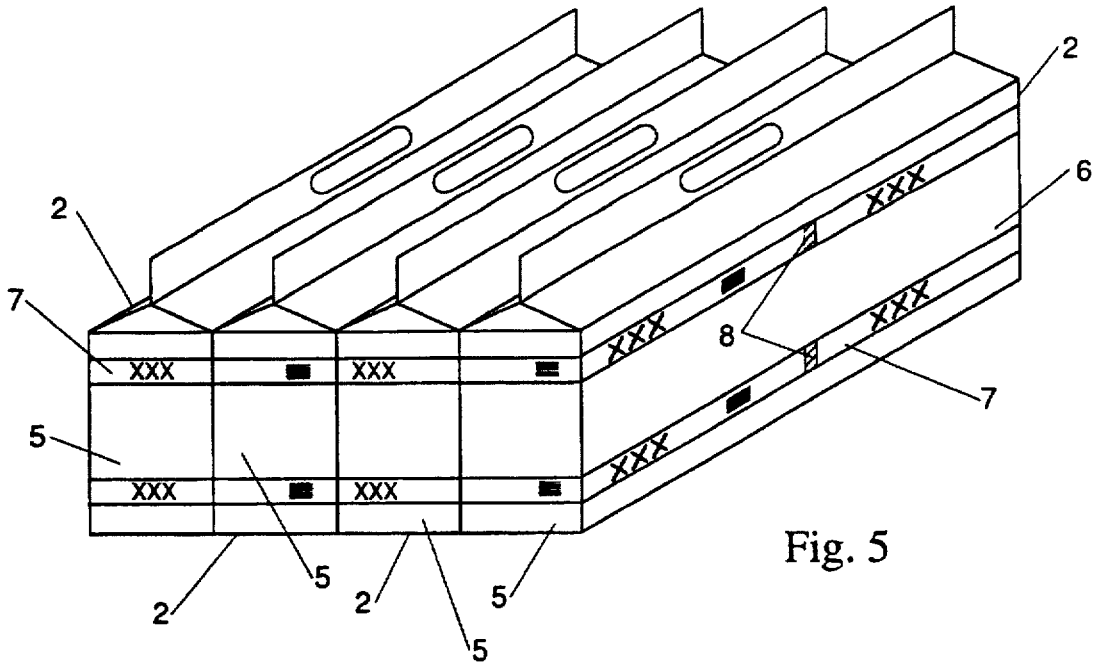

FIG. 5 shows a package similar to that of FIG. 2 with two pieces of adhesive tape 7 wound all the way around the shorter sides 5 and the longer sides 6 of the packs 2 and positioned in a similar manner to the four pieces of the configuration shown in FIG. 2.

Figure 6:
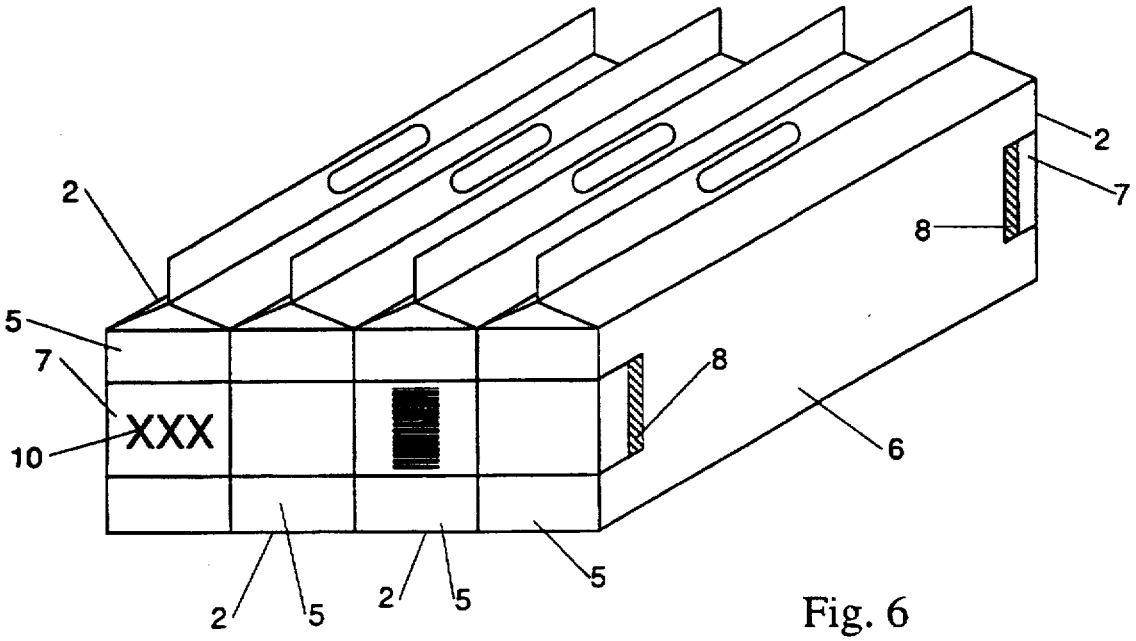
Figure 7:
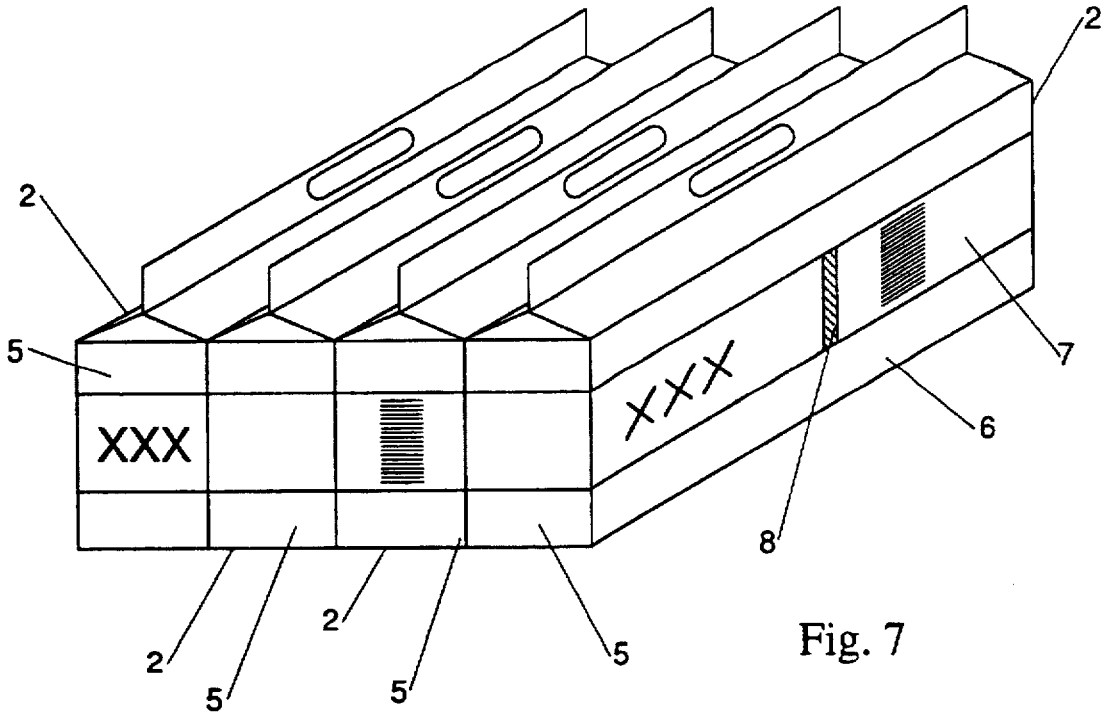

FIGS. 6 and 7 show a further two alternative configurations of the package of the present invention; in FIG. 6, the shorter sides 5 of the four packs are bound together by a single piece of adhesive tape 7 at each end, the tape also extending partially on the longer sides 6 and, in the configuration of FIG. 7, a single piece of adhesive tape 7 is wound all the way around the four packs 2 on their shorter sides 5 and on their longer outer sides 6. In both cases each piece of adhesive tape 7 is positioned in the center of the adjacent short sides 5, having such a height as to cover preferably at lease 40% of the total surface area of the shorter sides 5 of the packs 8.

In FIGS. 8 and 9, the upper and lower faces of the four packs 2 are bound together in a configuration which is particularly suitable for packs 2 each having a handle 3 with dimensions such that it extends solely on the central portion of the upper face, for example, of the type which is applied to the pack rather than being formed integrally therewith, as shown in the drawings.

FIG. 8 shows the four packs 2 joined together by two pieces of adhesive tape 7 fixed to the upper faces and by a further two fixed to the lower faces, the pieces also extending partially over the outer longer sides 6.

The pieces of adhesive tape 7 are generally positioned within the third of each upper and lower face which is adjacent the respective shorter side 5, in any case without interfering with the handles 3 disposed on the top; in partivular, as shown in FIGS. 8 and, the pieces of adhesive tape 7 are offset towards the shorter edges of the upper and lower faces and are parallel thereto.

In all the alternative configurations shown in FIGS. 5–9, each end of each piece 7 has an adhesive-free region 8 which can be gripped in order to start the removal of the tape and thus to separate one or more packs 2 from the group. If the piece or pieces of adhesive tape 7 are wound all the way around the packs 2, one end of each piece 7 may be superposed on the opposite end, as shown, in particular, in FIGS. 5, 7 and 9 which show a single adhesive-free region 8 for each piece 7, on one of the two outer longer sides 6; alternatively, the two ends may be spaced apart and thus both be visible when the package is still intact.

The package according to the present invention can, to advantage, be used with pallets of standard dimensions, the use of which is becoming increasingly widespread at the request of the large distribution and sales organisations.

FIGS. 10 and 11 show two different loading configurations on a pallet 13 of the same type with standard dimensions for conventional packages with corrugated cardboard boxes such as that shown in FIG. 1 and for packages according to the present invention, such as that shown in FIG. 2, respectively.

The packages according to the present invention are disposed on the pallet 13 in superposed layers with a sheet of corrugated cardboard 14 disposed between two layers approximately half-way up the whole stack in order to stabilise the stack; a second sheet 15 is preferably added on toop of the last layer.

In both cases, the load may be surrounded by a sheet of extensible plastics of the type commonly used for covering and protecting loads on pallets.

By avoiding the use of cardboard boxes, the package according to the present invention eliminates all the costs connected with the provision and use of such boxes and thus represents and advantage both for the manufacturer and for the customer who no longer has to open and empty the boxes in order to make the products accessible or finally to dispose of the empty boxes; the saving of space also achieves and overall reduction in storage and distribution costs.

The new package itself constitutes a sales unit for the product and, moreover, by virtue of the handles 3 of the individual packs 2 and the fact that the product can be recognized more readily than with conventional cardboard boxes, it can be dealt with more easily during the manual handling which is usually carried at the customers premises.

Moreover, the packages can also be positioned on sales shelves as they are without the need to separate the individual packs, the purchaser thus being left to take out the individual packs 2 directly by removing the piece or pieces of adhesive tape 7 which keep it bound to the package, thus being able to separate a single pack 2 at a time, leaving the rest of the package intact.

The products may also be taken to the point of sale directly on the pallets, once the extensible plastics covering sheet has been removed.

In the embodiments illustrated, the flexible plastics packs have dimensions of 145×420×240 mm (width×length×height) and each contains 36 disposable elasticated nappies of a type commonly available on the market which, in the extended configuration, measure 535×350 mm.

The packs are housed in corrugated cardboard boxes with dimensions of 340×420×520 mm and in packages according to the present invention with dimensions of 580×420×240 mm, each bound together by four pieces of adhesive tape 800 mm long and 60 mm wide; the pallets have standard dimensions of 1200×800 mm.

In the first case there are eighteen cardboard boxes on the pallet in three layers of six with a total height of 1560 mm, leaving an unused empty space in the center shown by shading in FIG. 10; in the second case, there are twenty-eight packages formed according to the present invention, arranged on the pallet in seven layers of four, with a total height of 1700 mm, which is slightly greater than in the first case but within the size limits fixed conventionally for loads on pallets; the saving of space thus achieved is about 50%.

Naturally this saving relates to the configuration of the embodiment illustrated.

In any case, although the dimensions of the individual packs 2 vary, for example, according to the different measurements of nappies and the number of packs which make up the package of the present invention, there will always be a saving of space, greater or less than that shown in the example, in comparson with corresponding conventional packages in cardboard boxes.

Naturally, the principle of the invention remaining the same, the details of construction and forms of embodiment may be varied widely with respect to those described and illustrated, without thereby departing from the scope of the present invention.

Figure 12:
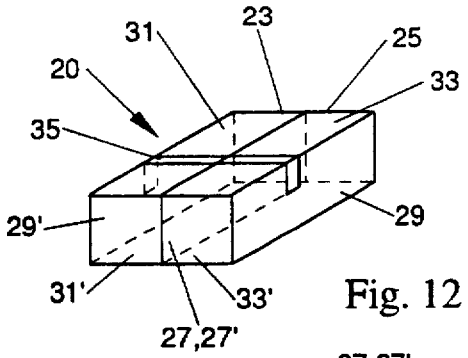
Figure 13:
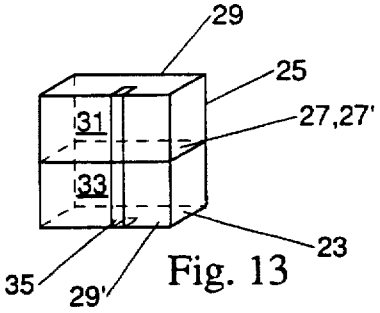
Figure 14:
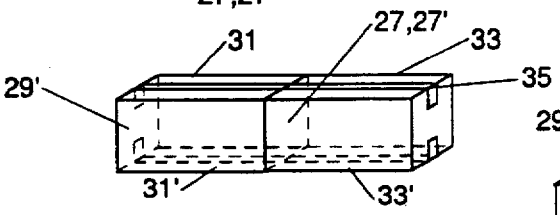
Figure 15:
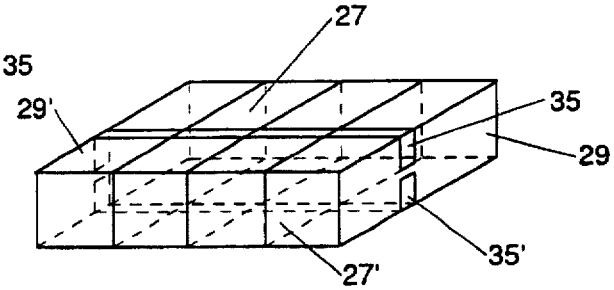
Figure 16:
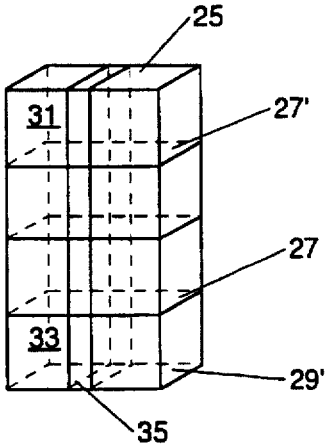
Figure 17:
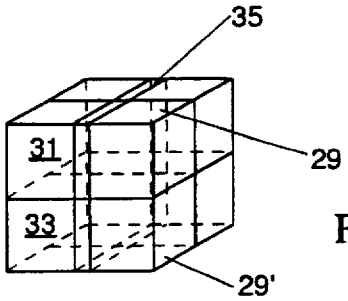
Figure 18:
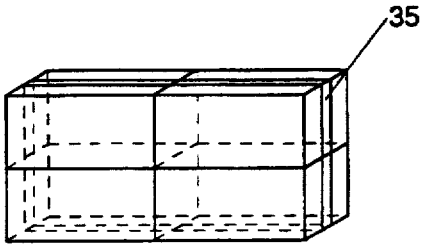
Figure 19:
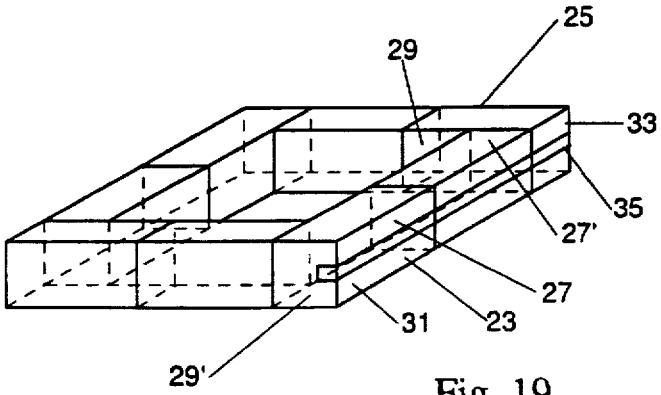

FIGS. 12, 13 and 14 show a package according to the invention consisting of two polyethylene diaper bags 23,25. In the package of FIGS. 12 and 13, two longitudinal side faces 27,27' of the bags 23,25 are contiguous. The bags are held in a fixed position by adhesive tape 35, which is sufficiently strong to enable the bags 25 and 23 to be carried, or otherwise transported, as a single unit. The tape 35 extends from the lateral side face 29 of bag 25, across the transverse side faces 31 and 33 of both bags 25 and 23 to the lateral side face 29' of bag 23. In this way, relative movement of bags 23 and 25 is prevented, both in a direction parallel to the plane of side faces 29,29' as well as in a direction perpendicular to the plane of the side faces 29,29'.

In the package according to FIG. 14, the bags 23,25 are aligned in their longitudinal direction. Two tapes 35,35' provide for a stable connection of the bags that can be easily undone.

In the package according to FIGS. 15 to 18, a plurality of bags is connected to form a single package by means of tape 35. The tape 35 can comprise a number of separate tape members, or can consist of one or more single strips that completely encircle the package. In the package according to FIG. 19, a multiplicity of bags 25, 23 is configured and connected for shipment on a pallet of predetermined dimensions.

What is claimed is:

1. A package comprising two packs, each of said packs having a contact surface, a lateral side face extending generally parallel to said contact surface, and a pair of transverse side faces extending generally transversely to said contact surface, said packs being placed with their contact surfaces in facing relationship and being mutually connected by at least one piece of adhesive tape extending across at least one of said transverse side faces of each of said packs which holds said packs in a relatively fixed position with respect to one another so they can be transported as a unit, said transverse side faces of said packs generally extending in the same plane.

* * * * *